US012152712B1

United States Patent
Johnston

(10) Patent No.: US 12,152,712 B1
(45) Date of Patent: Nov. 26, 2024

(54) THREE-GEAR HOSE CLAMP APPARATUS

(71) Applicant: Matthew Johnston, Montgomery, NY (US)

(72) Inventor: Matthew Johnston, Montgomery, NY (US)

( * ) Notice: Subject to any disclaimer, the term of this patent is extended or adjusted under 35 U.S.C. 154(b) by 0 days.

(21) Appl. No.: 18/374,844

(22) Filed: Sep. 29, 2023

Related U.S. Application Data

(60) Provisional application No. 63/412,413, filed on Oct. 1, 2022.

(51) Int. Cl.
*F16L 33/20* (2006.01)
(52) U.S. Cl.
CPC .................. *F16L 33/20* (2013.01)
(58) Field of Classification Search
CPC .......... F16L 33/20; F16L 33/08; F16L 33/085
USPC ......................................... 285/252
See application file for complete search history.

(56) References Cited

U.S. PATENT DOCUMENTS

| | | | | |
|---|---|---|---|---|
| 2,405,913 A | * | 8/1946 | Tinnerman | F16L 33/14 24/274 R |
| 2,408,347 A | | 9/1946 | Sprouse | |
| 2,938,690 A | | 5/1960 | Castle | |
| 4,558,493 A | | 12/1985 | Dowdell | |
| 5,671,506 A | * | 9/1997 | Eliasson | F16L 33/08 24/19 |
| 5,729,873 A | | 3/1998 | Miley | |
| 7,329,157 B2 | * | 2/2008 | Maxwell | H01R 11/285 24/274 R |

* cited by examiner

*Primary Examiner* — David Bochna
(74) *Attorney, Agent, or Firm* — Michael E. Zall

(57) ABSTRACT

A three-gear hose clamp apparatus designed to securely fasten around hoses. The apparatus includes a clamping band having openings disposed at distal end and forms a loop around hose, when its distal end and proximal end overlap. The constriction and expansion of clamping band is facilitated by a clamp assembly, which employs a drive helical gear with a head section and threaded shaft. The drive helical gear interfaces with a driven spur gear set at a perpendicular axis, which is in direct contact with an elongated driven helical gear that rotates co-axially, its threads mating with the openings of the clamping band. The mechanism is housed in two distinct housings: one that covers the driven helical gear and another envelops both the drive helical gear and driven spur gear.

7 Claims, 6 Drawing Sheets

THREE-GEAR HOSE CLAMP APPARATUS

CROSS-REFERENCE TO RELATED APPLICATIONS/INCORPORATION BY REFERENCE

This application claims priority to U.S. provisional application 63/412,413 titled "HOSE CLAMP" filed on Oct. 1, 2022 which is incorporated herein by reference in its entirety for all purposes.

TECHNICAL FIELD

The present disclosure generally relates to hose clamping devices, and more particularly, to a three-gear hose clamp apparatus to securely fasten around hoses. Disclosed is a gear assembly that facilitates the constriction and expansion of a clamping band, enabling a firm and adjustable engagement around hoses.

BACKGROUND

The background description includes information that may be useful in understanding the present invention. It is not an admission that any of the information provided herein is prior art or relevant to the presently claimed invention, or that any publication specifically or implicitly referenced is prior art.

Generally, hose clamps have been a staple for several decades. Small yet pivotal devices play a crucial role in securing hoses to fittings, ensuring there is no unintentional detachment or leakages. Hose clamps are commonly found in a myriad of applications, from automotive engines to home appliances, ensuring the seamless transfer of liquids or gases without spillage or wastage. Their fundamental purpose is to exert radial pressure to bind hoses onto fittings, ensuring a tight and leak-free connection.

Traditionally, hose clamps, often referred to as hose clips, have been constructed using metal bands tightened around a hose. Tightening is usually achieved using various means such as screws, which when turned, pull the bands tight, clamping the hose onto the fitting. These means are effective for many applications, however, often subjected to certain limitations and drawbacks. One of the primary concerns has been inconsistent pressure distribution around the hose. If the pressure is not distributed evenly, the uneven distribution could lead to weak points, which might be vulnerable to leaks.

Despite the seemingly simple design of the hose clamps, a leak in a hose clamp can lead to substantial consequences, especially in critical applications such as fuel lines or cooling systems in vehicles. Leaks could result from various reasons. Over time, the screw mechanism might wear out, leading to a loose fit. Additionally, due to external environmental factors like temperature fluctuations, hoses may expand or contract, compromising the initial secure fit of the clamp. Metal fatigue, resulting from repeated tightening and loosening or prolonged exposure to corrosive elements, can also compromise the integrity of clamp.

Moreover, many of the traditionally used hose clamps have a fixed diameter, meaning they are designed for hoses of a specific size. The lack of adaptability requires users to have a plethora of different sizes on hand, making inventory management and quick repairs cumbersome. The process of adjusting or repositioning the clamps is also not user-friendly, often requiring specialized tools or excessive manual effort, which can be inconvenient and time-consuming.

Another drawback of many conventional hose clamps is the damage to the hose itself. In efforts to secure a tight fit, users might overtighten the clamp, leading to the compression, damage, or even rupture of hose. The process results in immediate leakage and can also reduce the lifespan of the hose, leading to frequent replacements and increased operational costs.

Given the plethora of challenges and the critical role hose clamps play in myriad applications, there is huge market for a clamp design that promises consistent pressure distribution, minimize risk of leakages, adaptable to different hose sizes, ensure user-friendly operation, and prolong hose lifespan by minimizing damage.

SUMMARY

The present disclosure generally relates to hose clamping devices, and more particularly, to a three-gear hose clamp apparatus to securely fasten around hoses. Disclosed is a gear assembly that facilitates the constriction and expansion of a clamping band, enabling a firm and adjustable engagement around hoses.

The aim of the present disclosure is to provide a three-gear hose clamp apparatus to secure hoses to fittings, ensuring there is no unintentional detachment or leakages. The aim of the disclosure is achieved by the three-gear hose clamp apparatus which provides efficient constriction and expansion of the loop around the hose to prevent unintentional detachment or leakages of a fluid.

The present disclosure pertains to a three-gear hose clamp apparatus designed to securely fasten around a hose. The three-gear hose clamp apparatus features a clamping band with a body that showcases multiple openings located towards a distal end. The clamping band, by overlapping the proximal and distal ends, forms a loop around the hose. A significant feature of the apparatus is the clamp assembly that facilitates the constriction and expansion of the loop. The clamp assembly integrates a drive helical gear, which, when acted upon by a user, rotates around an axis parallel to the center of hose. The drive helical gear is equipped with a head section and a threaded shaft. In coordination, there is a driven spur gear that meshes with the drive helical gear and a co-axially placed driven helical gear that rotates to engage with the openings of the clamping band. To house the assembly, a clamping band housing is situated at the proximal end, allowing the clamping band to slide for adjustments. Above the housing sits a first housing encapsulating the driven helical gear, while a separate, adjacent second housing shelters the drive helical gear and the driven spur gear, ensuring protection and precision in the operation of the apparatus.

In an embodiment, the clamping band is constructed of a metal selected from the group consisting of copper, iron, stainless steel and aluminum.

In an embodiment, the plurality of openings is evenly spaced from each other.

In an embodiment, the clamping band comprises an anti-slip surface on an inner side to improve grip on the hose.

In an embodiment, the clamping band is associated with a rubberized base to prevent scratches or damage to the hose.

In an embodiment, the clamping band housing further comprises a locking mechanism to prevent unintentional sliding of the clamping band.

In an embodiment, the clamping band comprises multiple outward projecting teeth on a surface that in contact with the hose.

In an embodiment, a handle is attached to the head section of the drive helical gear to facilitate rotation.

In yet another embodiment, the first housing and the second housing are interconnected via a quick-release mechanism, enabling easy assembly and disassembly.

In another embodiment, a visual indicator is incorporated on the head section, indicating the direction of rotation for constriction or expansion of the clamping band.

In an embodiment, the distal end is associated with a tapered surface to facilitate smoother entry into the clamping band housing.

In an embodiment, the driven helical gear is associated with a safety latch to prevent the movement of the driven helical gear.

BRIEF DESCRIPTION OF THE DRAWINGS

The features and advantages of the present disclosure would be more clearly understood from the following description taken in conjunction with the accompanying drawings in which.

DETAILED DESCRIPTION OF EMBODIMENTS

Figure 1:
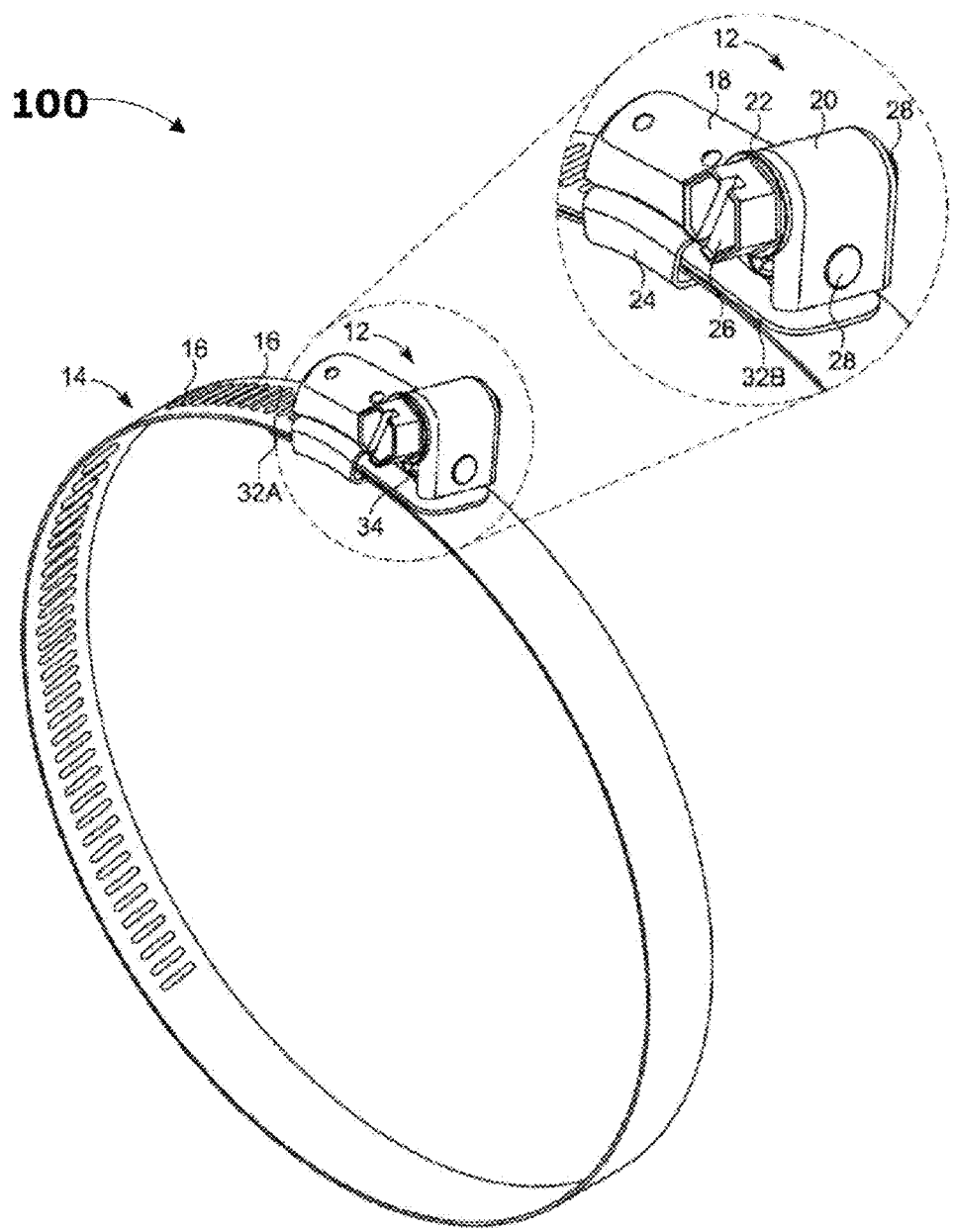
FIG. 1 illustrates a three-gear hose clamp apparatus for clamping hoses, in accordance with embodiments of the present disclosure.

In the following detailed description of the invention, reference is made to the accompanying drawings that form a part hereof, and in which is shown, by way of illustration, specific embodiments in which the invention may be practiced. In the drawings, like numerals describe substantially similar components throughout the several views. These embodiments are described in sufficient detail to claim those skilled in the art to practice the invention. Other embodiments may be utilized, and structural, logical, and electrical changes may be made without departing from the scope of the present invention. The following detailed description is, therefore, not to be taken in a limiting sense, and the scope of the present invention is defined only by the appended claims and equivalents thereof.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The present disclosure generally relates to hose clamping devices, and more particularly, to a three-gear hose clamp apparatus to securely fasten around hoses. Disclosed is a gear assembly that facilitates the constriction and expansion of a clamping band, enabling a firm and adjustable engagement around hoses.

FIG. 1 illustrates a three-gear hose clamp apparatus 100 for clamping hoses to fluid outlet port such as tap, valve etc., in accordance with embodiments of the present disclosure. The three-gear hose clamp apparatus 100 (interchangeably referred as apparatus 100 or clamp apparatus 100 or clamp 100) utilizes a gear mechanism to ensure seamless constriction and expansion of a loop around the hose. The three-gear hose clamp apparatus 100 comprises a clamping band 14, a clamp assembly 12 and other known components of a hose clamp device/apparatus 100.

In one embodiment, the clamping band 14 comprises a proximal end 32A, a distal end 32B, and a body extending between the proximal end 32A and the distal end 32B. The body comprises a plurality of openings 16 towards the distal end 32B, wherein the openings 16 facilitate optimal interaction with corresponding components of the apparatus 100. When the proximal end 32A and the distal end 32B of clamping band 14 are overlapped, a loop is formed. The loop receives a terminal end of discharge port/fittings (e.g., pipe) and a proximal end of hose, which wrap around the discharge port. The apparatus 100 provides efficacious clamping, preventing any fluid leakage and sudden detachment of the hose from the discharge port to maintain integrity under varied conditions. As apparatus 100 exerts uniform force on circumferential surface of hose, the hose remains attached to the discharge port to prevent leaks in fluid or air systems.

In an embodiment, the clamp apparatus 100 further integrates clamp assembly 12 to facilitate the constricting and expanding motions of the loop. The clamp assembly 12 comprising a drive helical gear 28 that operates by rotation on a first axis. The drive helical gear 28 can be set parallel to the central axis of the hose, upon force applied by a user. The drive helical gear 28 comprising a head section 26 and a shaft. Notably, the surface of the shaft includes a first set of threads having optimal pitch and depth for improved torque transfer.

In an embodiment, the drive helical gear 28 is configured to rotate around a first axis, the orientation of the drive helical gear 28 aligns parallel to the central axis of the hose encompassed by the drive helical gear 28. Such alignment ensures seamless rotational dynamics, minimizing friction and allowing efficient force transfer, when actuated by the user. The threading aids in the optimal meshing with corresponding gears and also contributes to the durability and smooth operation of the apparatus 100. The drive helical gear 28 enables capacity of clamp apparatus 100 to exert controlled constriction and expansion forces on the clamping band 14.

In one embodiment of the apparatus 100, the drive helical gear 28 operates in tandem with a driven spur gear 34, which rotates on a second axis, placed perpendicularly to the first axis (of the drive helical gear 28), thus ensuring a diverse rotation mechanism. Such perpendicular orientation enables interaction between the drive helical gear 28 and the driven spur gear 34, thereby fosters more synchronized and efficient motion transfer mechanism. The driven spur gear 34 features a set of teeth, which extend radial outwardly. Among the set, a particular subset of teeth engages and meshes with the helical threads presented on the drive helical gear 28. Meshing of group of teeth with threads of the driven helical gear enables transfer of mechanical power efficiently between two perpendicular axes, thus allows for a larger contact ratio, which in turn enables the transmission of higher torque values. The meshing arrangement between group of teeth and the threads (helical gear 28) provides a smoother operation due to the gradual engagement and disengagement of the group teeth and threads.

In another embodiment, the apparatus 100 comprises a driven helical gear 30 that is arranged to be co-axial and in physical contact with the driven spur gear 34. The physical contact ensures that the driven helical gear 30 functions in tandem with the spur gear 34. The co-axial arrangement of the helical gear 30 and spur gear 34 facilitates streamlined power transmission pathway along a common axis, ensuring a compact and efficient transfer of mechanical energy. The driven helical gear 30 revolves around a third axis, setting the third axis apart in the operational dynamics. The driven helical gear 30 comprising helical threads which is characterized by geometry of helical threads, including the helix angle, pitch, and depth. The geometry of the helical threads can ensure optimal engagement and disengagement with the corresponding openings 16.

The apparatus 100 is structured such that a continuous series of the helical threads align perfectly with specific openings 16 present on the clamping band 14. Such congruence ensures that at any given rotation position, there is always a helical thread engages with one of the openings 16, providing a seamless and efficient grip mechanism.

In yet another embodiment, the proximal end 32A of the clamping band 14 is integrated with a clamping band housing 24 that is characterized by a recess. The recess provides a streamlined channel or path for the distal end 32B of the clamping band 14, allowing the clamping band 14 to slide with minimal friction and maximum precision. The recess is specifically shaped and sized to perfectly accommodate the dimensions and contours of the clamping band 14 from the distal end 32B, ensuring a snug fit that eliminates unwanted play or lateral movement. The recess facilitates smooth overlapping mechanism for the proximal end 32A and distal end 32B of the clamping band 14 and ensuring an effortless separation of the proximal end 32A and distal end 32B. The dynamic overlapping and separation capability provided by the interaction between the clamping band housing 24 and the clamping band 14, ensures that the apparatus 100 can be tailored to achieve a customizable fit around any hose.

In yet another embodiment, a first housing 18 is provided for shielding and accommodating the driven helical gear 30. The first housing 18 is positioned onto the clamping band housing 24, facilitating a layered and nested configuration. The first housing 18 ensures that the driven helical gear 30 remains consistently enclosed and isolated from any external environmental or mechanical interferences. Such protective measures maintain optimal gear performance, mitigate risks of damage, wear, or other disruptions that might adversely impact the function or lifespan of the driven helical gear 30.

In an embodiment, a second housing 20 is arranged, wherein the second housing 20 is characterized by a spatial separation from the clamping band housing 24. The second housing 20 remains physically interconnected to the first housing 18 through a linking means. The second housing 20 encapsulates and protects the drive helical gear 28 and the driven spur gear 34. Such protective configuration ensures that both the drive helical gear 28 and the driven spur gear 34 are shielded from external adversities (e.g., moisture, leakage fluid). Such shielding safeguards the operational efficiency and longevity of the drive helical gear 28 and the driven spur gear 34, thereby ensuring that they consistently perform at optimal levels.

In an embodiment, the clamping band 14 can be made of metal selected from copper, iron, stainless steel, and aluminum. Copper, known for malleability and excellent heat conductivity, offers efficient temperature regulation. Exemplified metals can be associated with high melting points and can withstand higher temperatures without losing structural integrity thereof. The structural integrity at higher temperature is crucial in high-temperature applications.

In an embodiment, positioning of the openings 16 can be uniform, as uniform spacing ensures that any force or pressure exerted on the clamping band 14 is evenly distributed. Additionally, by having the symmetrical design, the openings 16 allows more predictable and consistent behavior, when accommodating hoses of different materials and thicknesses. The precision-driven structure enhances the overall efficiency and reliability.

In an embodiment, the clamping band 14 may be furnished with an anti-slip surface on the inner side. The textured or treated surface reduce the probability of the hose slipping or shifting during the clamping process. The anti-slip surface is vital during dynamic applications where hoses might be subject to movement or varying pressures. Ensuring firm and stable grip prevents mishaps, allows airtight sealing, and prolongs the lifespan of both the hose and the clamping apparatus 100.

In an embodiment, the clamping band 14 may integrate a rubberized base layer, which acts as a cushion for the hose, protecting the clamping band 14 from any direct and abrasive metal contact. The rubberized base layer substantially reduces the risk of the hose getting damaged, scratched, or undergoing premature wear and tear during the clamping process. Also, the rubberized base provides an added layer of grip, reinforcing the anti-slip properties of the clamping band 14.

In an embodiment, the clamping band housing 24 may incorporate a locking mechanism to ensure the stability of the clamping process. The locking mechanism protects from unintentional or accidental sliding of the clamping band 14. In dynamic operational environments, where vibrations or external pressures are prevalent, such locking mechanism becomes more useful. The locking mechanism ensures that once the clamping band 14 is clamped and locked in position, the clamping band 14 remains steadfast, thereby guaranteeing consistent and reliable seal. The locking mechanism can be associated with the drive helical gear 28, the driven spur gear 34 and driven helical gear 30. The user can activate locking mechanism, after completion of securing the hose with discharge port, to prevent rotation of drive helical gear 28, the driven spur gear 34 and driven helical gear 30. Thus, the locking mechanism can eliminate loosening of the apparatus 100. Further, user can deactivate locking mechanism, before execution of any force onto the apparatus 100 to constrict or expand the loop.

In an embodiment, the clamping band 14 may comprise the multiple outward-projecting teeth on the surface (i.e., inner surface) that interfaces with the hose. The teeth enhance the grip on the hose, ensuring that the clamping band 14 clings more effectively, reducing the likelihood of slippage. In environments where the hose might be subjected to lateral forces or movements, the teeth ensures that the clamping remains secure.

In an embodiment, a handle may be affixed to the head section 26 of the drive helical gear 28, wherein the handle offers greater control over the rotation of the drive helical gear 28. By facilitating manual rotation, user can exert force, ensuring that tightening or loosening is accurate. Such feature enhances the user experience and also augments the precision and reliability of the clamping process. Further, the handle also eliminates the requirement of specific tool (e.g., screwdriver) to tighten or loosen the apparatus 100.

In an embodiment, the first housing 18 and the second housing 20 employ a quick-release mechanism that reduces the time required for assembly or disassembly. Whether the process is routine maintenance, adjustments, or addressing unforeseen issues, such quick-release mechanism enhances efficiency, reduces errors, and enables streamlined operational experience.

In an embodiment, a visual indicator can be arranged on the head section 26. The visual indicator provides users with a clear visual cue denoting the direction of rotation necessary for either constriction or expansion of the clamping band 14. This becomes more useful in high-pressure scenarios where timely and accurate adjustments are essential.

In an embodiment, the distal end 32B may incorporate a sleek, tapered surface to facilitate smoother and hassle-free entry into the clamping band housing 24. By reducing friction or misalignment, the tapered surface ensures that the insertion process is smoother, faster, reliable, efficient and user-friendliness of the apparatus 100.

In an embodiment, the driven helical gear 30 may be equipped with a safety latch mechanism to prevent any inadvertent movement or rotation of the driven helical gear 30. By ensuring the driven helical gear 30 remains static, the safety latch mechanism acts as a safety buffer, preventing unintentional adjustments and ensuring that the clamping process remains consistent and reliable.

In an embodiment, the integration of the drive helical gear 28, the driven spur gear 34, and the driven helical gear 30 provides efficiency and precision. The drive helical gear 28, activated by user exertion, operates on the first axis parallel to the central axis of the hose. The drive helical gear 28, particularly the first set of threads on the shaft, ensures precise torque transmission to the succeeding gears. The perpendicular relationship between the first axis and the second axis, on which the driven spur gear 34 rotates, facilitates a directional change in mechanical motion. The driven helical gear 30 can be co-axially arranged and in contact with the driven spur gear 34. The driven helical gear 30 includes an array of helical threads, which mesh with corresponding openings 16 of clamping band 14. As a result, every rotation ensures that the helical thread continuously aligns with opening 16 to achieve a consistent and smooth clamping action. Such meshing of helical thread with opening 16 may provide a highly responsive engagement and adjustment mechanism for the clamping band 14, and also reduces risks associated with slippage or misalignment.

Figure 2:
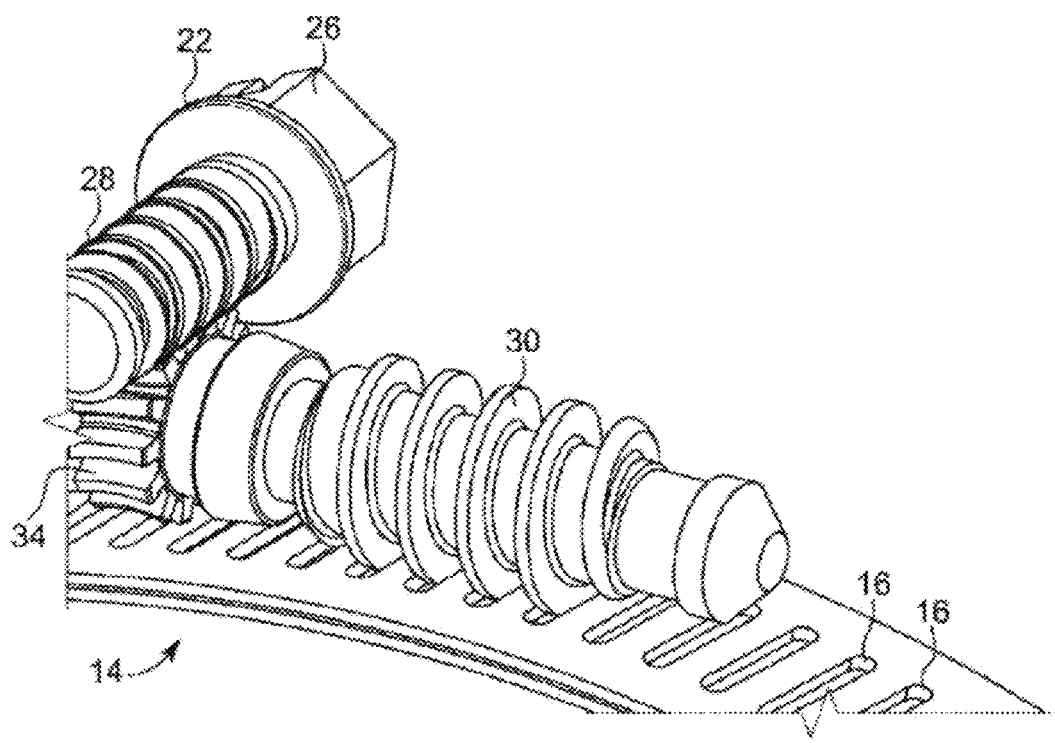
FIG. 2 illustrates an interaction mechanism for the three-gears utilized in the hose clamp apparatus, in accordance with embodiments of the present disclosure.

FIG. 2 illustrates an interaction mechanism for the three-gears utilized in the hose clamp apparatus 100, in accordance with embodiments of the present disclosure. As illustrated, the threads of the driven helical gear 30 mesh with the openings 16 located on the clamping band 14 to establish mechanical relationship for the functioning of the apparatus 100. Adjacently mounted to one end of the driven helical gear 30 is the driven spur gear 34, which comprises the teeth and engages seamlessly with the drive helical gear 28. Turning of the head section 26 (by user) attached to drive the terminus of the helical gear 28 can be performed using tools like a wrench or screwdriver, thereby triggering a sequence of rotations. Specifically, the initial turn of the drive helical gear 28 impels the rotation of the driven spur gear 34. In turn, the rotation of the driven helical gear 30 causes effective tightening or, alternatively, loosening the clamping band 14, depending on the direction of rotation.

Figure 3:
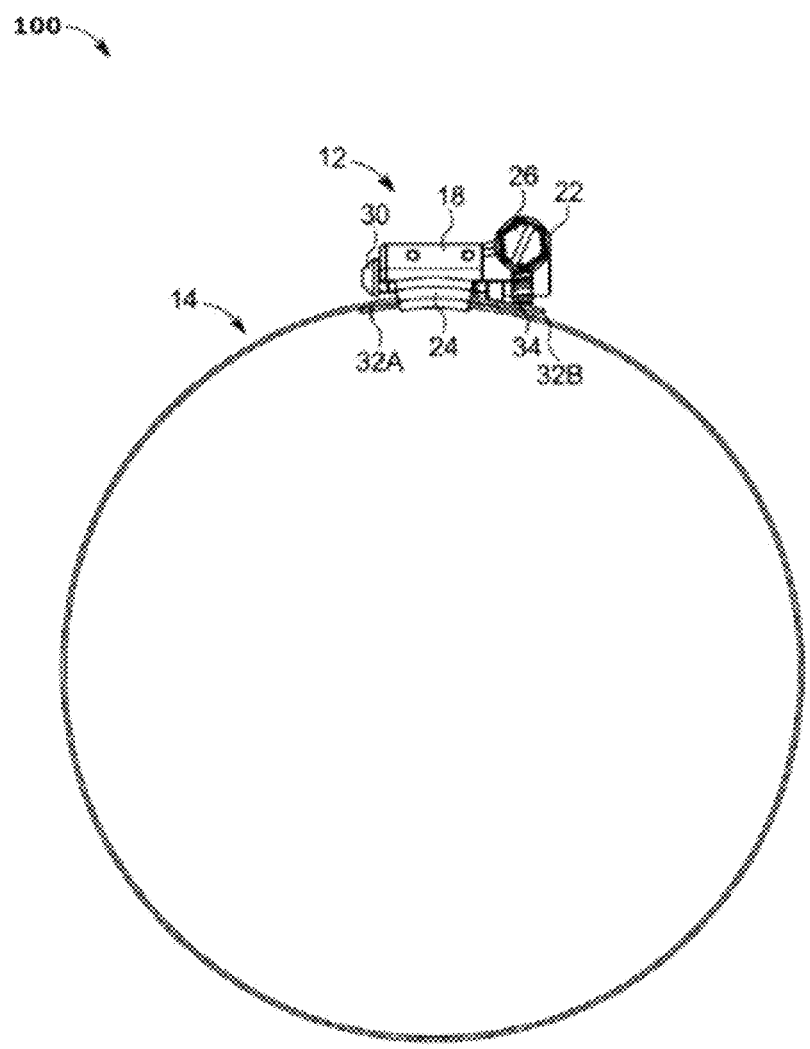
FIG. 3 provides a detailed side perspective of the three-gear hose clamp apparatus, incorporating both the clamp assembly and the clamping band, in accordance with embodiments of the present disclosure.

FIG. 3 provides a detailed side perspective of the three-gear hose clamp apparatus 100, incorporating both the clamp assembly 12 and the clamping band 14, in accordance with embodiments of the present disclosure. The side view enables a clearer visualization of the alignment and arrangement of the interconnected components. From the side view, a person ordinarily skilled in the art can discern the sequential positioning of the multiple gears.

Figure 4:
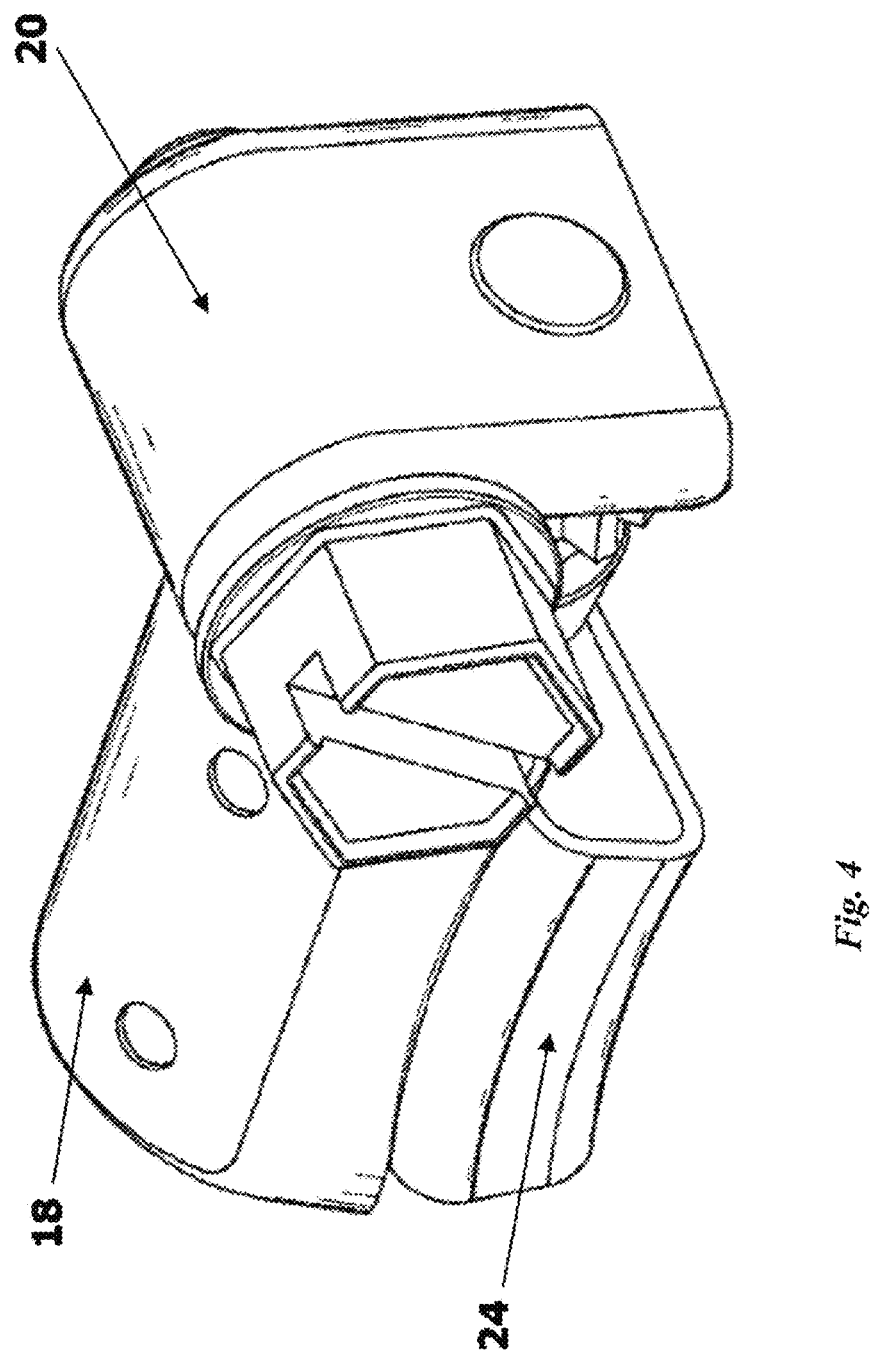
FIG. 4 depicts a perspective view of the three-gear hose clamp apparatus from a combined top and right-side angle, in accordance with embodiments of the present disclosure.

FIG. 4 depicts a perspective view of the three-gear hose clamp apparatus 100 from a combined top and right-side angle, in accordance with embodiments of the present disclosure. The view enables visualization of the spatial relationship between the multiple gears and the integrated components. At an angle, the strategic positioning and structure of the hose clamp adjustment mechanism becomes visible. Such integral feature facilitates dynamic modulation, granting users the ability to efficiently loosen or tighten the clamping band 14, ensures optimal and secure grip around the hose.

Figure 5:
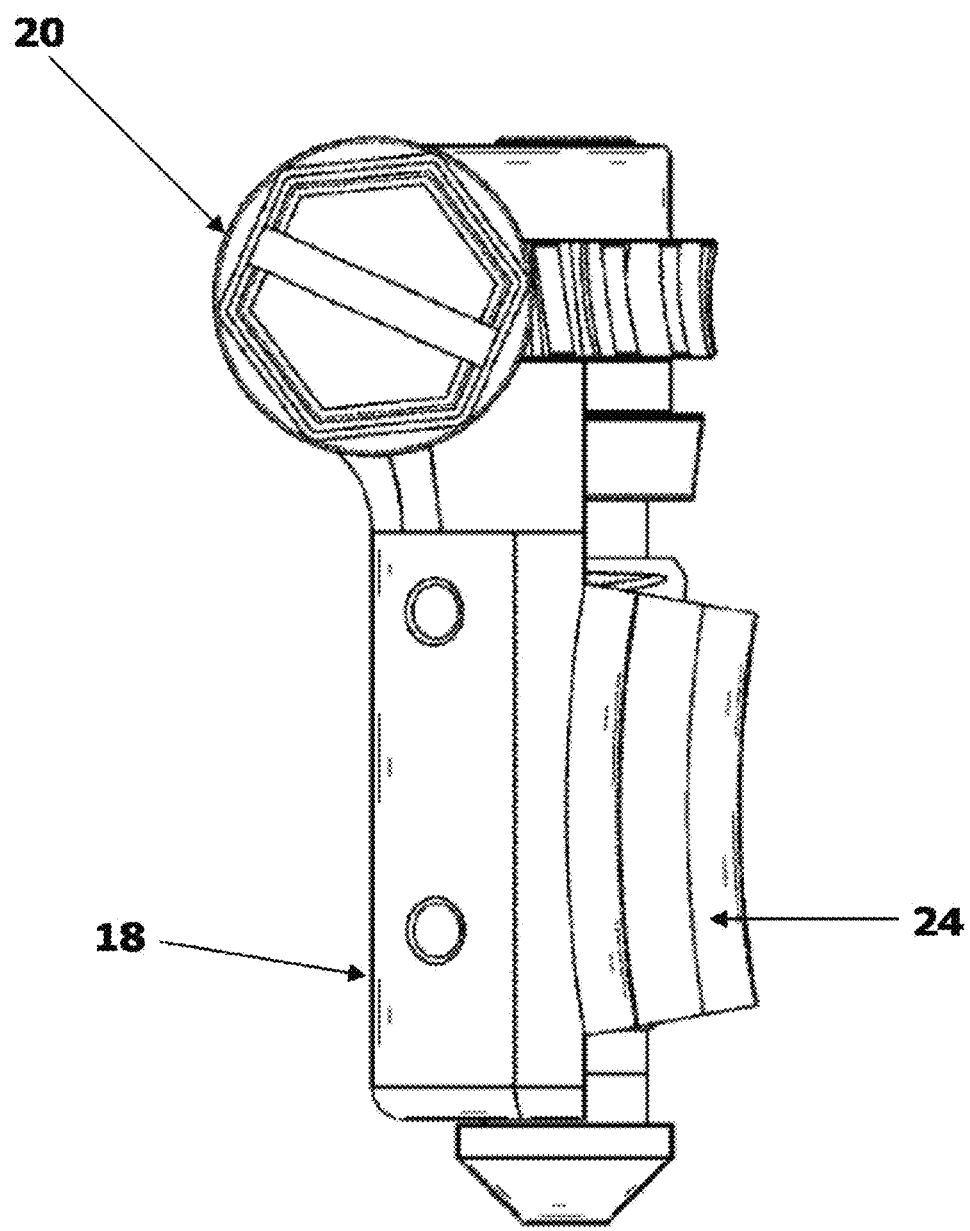
FIG. 5 displays a right-side view of the three-gear hose clamp apparatus, in accordance with embodiments of the present disclosure.

FIG. 5 displays a right-side view of the three-gear hose clamp apparatus 100, in accordance with embodiments of the present disclosure. The first housing 18 demarcates the specific position and function within apparatus 100. Adjacently, the second housing 20 can be associated with the apparatus 100. Additionally, the clamping band housing 24 enables guiding and sliding movement of the clamping band 14.

Figure 6:
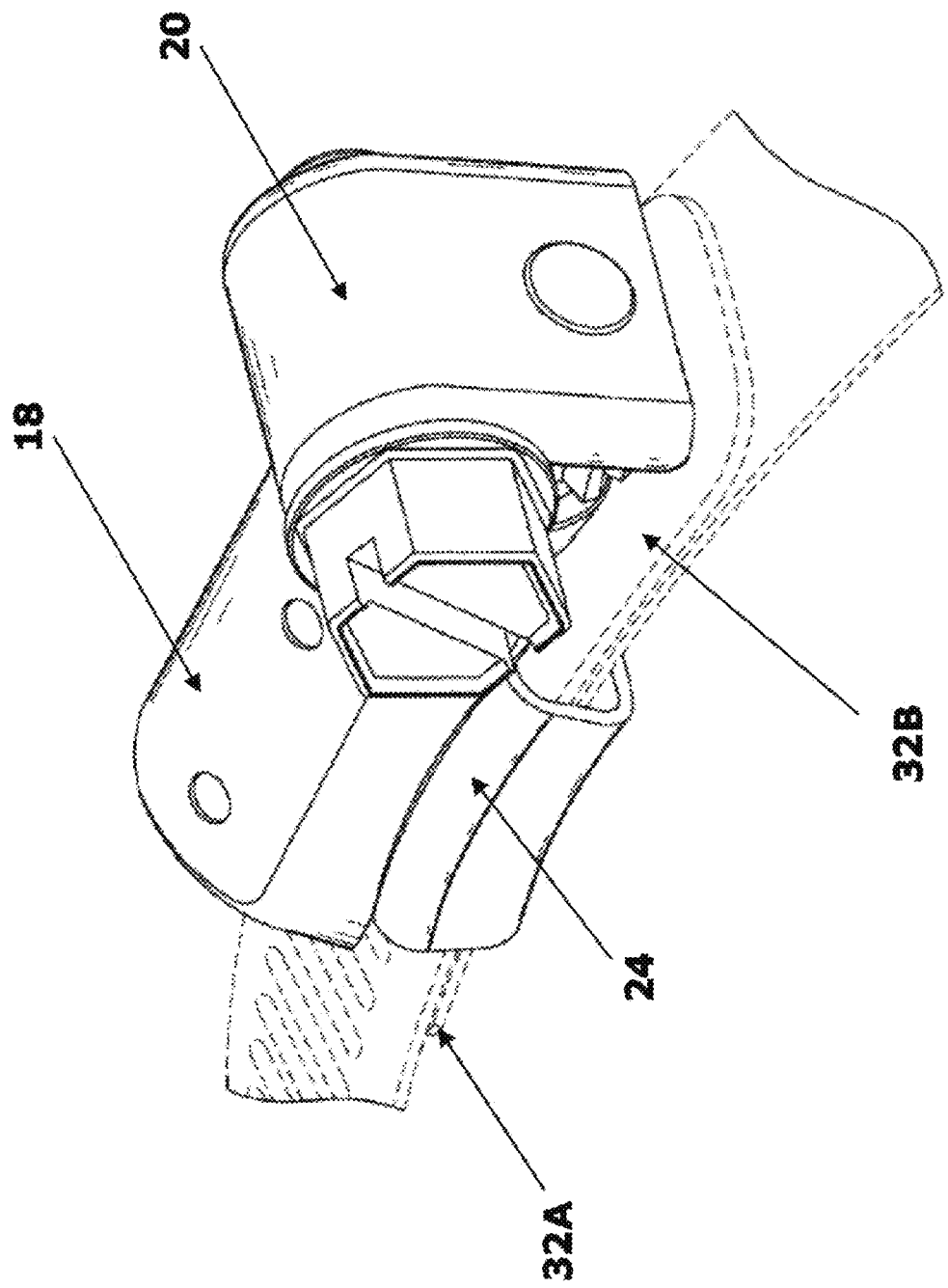
FIG. 6 presents a detailed depiction of the overlapping mechanism involving the proximal end and the distal end of the three-gear hose clamp apparatus, in accordance with embodiments of the present disclosure.

FIG. 6 presents a detailed depiction of the overlapping mechanism involving the proximal end 32A and the distal end 32B of the three-gear hose clamp apparatus 100, in accordance with embodiments of the present disclosure. In the visual representation, the clamping band 14 is shown with the proximal end 32A overlaying the distal end 32B, to form loop like structure, which receives hose. Such overlapping ensures the efficacy of the clamp apparatus 100. By virtue of the overlap, the clamping band 14 inherently the loop, or circle, snugly fits and secures around the hose. This ensures the hose is held in place without slippage, optimizing the effectiveness of the apparatus 100.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The invention claimed is:

1. A three-gear hose clamp apparatus comprising:
   a clamping band comprises a proximal end, a distal end and a body extending between the proximal end and the distal end, wherein the body comprises a plurality of openings disposed towards the distal end, and wherein the body forms a loop around a hose upon overlapping of the distal end and the proximal end;
   a clamp assembly arranged to enable constriction and expansion of the loop, wherein the clamping assembly comprising:
      a drive helical gear rotates on a first axis upon force exerted by a user, wherein the first axis is parallel to a central axis of the hose, wherein the drive helical gear comprises:
         a head section; and
         a shaft comprises a first set of threads disposed on surface of the shaft;
      a driven spur gear rotates on a second axis, wherein the driven spur gear comprises a set of the teeth, wherein a group of the teeth are arranged to mesh with a group of threads of the driven helical gear, wherein the second axis is perpendicular to the first axis;
      a driven helical gear disposed co-axially and in physical contact with the driven spur gear, wherein the driven helical gear rotates on a third axis, wherein the driven helical gear comprises an array of helical threads, wherein a series of the helical threads mate with a series of the openings;
      a clamping band housing disposed on the proximal end, wherein the clamping band housing comprising a recess to enable the distal end of the clamping band to slidably overlap the proximal end of the clamping band;
      a first housing disposed on top of the clamping band housing, wherein the first housing encloses the driven helical gear; and
      a second housing disposed space apart from the clamping band housing and physically connected to the first housing, wherein the second housing encloses the drive helical gear and driven spur gear.

2. The apparatus of claim 1, wherein said clamping band is constructed of a metal selected from the group consisting of copper, iron, stainless steel and aluminum.

3. The three-gear hose clamp apparatus of claim 1, wherein the plurality of openings are evenly spaced from each other.

4. The apparatus of claim 1, wherein the clamping band comprises an anti-slip surface on an inner side to improve grip on the hose.

5. The apparatus of claim 1, wherein clamping band includes a rubberized base layer to prevent scratches or damage to the hose.

6. The apparatus of claim 1, further comprising a handle attached to the head section of the drive helical gear to facilitate rotation.

7. The apparatus of claim 1, wherein the distal end includes a tapered surface to facilitate smoother entry into the clamping band housing.

* * * * *